INVENTORS
John T. Potter,
Thomas P. Foley &
Carmine J. Antonucci INVENTORS
John T. Potter,
Thomas R. Foley &
Carmine J. Antonucci વ
United States Patent Office 3,499,382
Patented Mar. 10, 1970

3,499,382
MODULAR ASSEMBLY FOR HIGH SPEED CHAIN PRINTERS
John T. Potter, Plainview, Thomas P. Foley, Huntington, and Carmine J. Antonucci, Uniondale, N.Y., assignors to Potter Instrument Company, Inc., Plainview, N.Y., a corporation of New York
Original application Nov. 24, 1965, Ser. No. 509,501. Divided and this application Nov. 24, 1967, Ser. No. 703,499
Int. Cl. B41j 1/30
U.S. Cl. 101—93                7 Claims

ABSTRACT OF THE DISCLOSURE

This disclosure contains drawings and a description of a high speed chain printer in which the print chain is established by a plurality of integrally casted printing slugs clipped about the edges of a reinforced elastomeric timing belt. The print chain is supported relative to a plurality of print hammers by a frame featuring a modular or subassembly construction in which the basic components are formed from a length of precision stock of the same cross-section. Also, the printer includes a substantially inertialess control for web or paper feed by employing a paper feed clock in format control loop formed of paper and driven directly by the same tractors which feed the paper web.

CROSS REFERENCE TO RELATED APPLICATIONS

This application is a division of co-pending application Ser. No. 509,501, filed Nov. 24, 1965.

This invention relates to high speed printers, and more particularly it concerns improved, low cost high speed printers of the type known as chain printers.

In chain printers of the type referred to, a chain of uniformly spaced print members is moved at constant speed in a continuous path, a portion of the path lying on a print line extending transversely of a record receiving web, such as paper, which is turn is fed intermittently, line by line, into registry with the print line by a feed mechanism controlled electronically. A plurality of hammers located respectively on print columns in the print line, are operated selectively by computer controlled electronic firing circuits to impress the web against a selected print member on the print line as that print member moves into registry with the print column on which the selected hammer is located.

The chain or print members or the "print chain" usually includes an endless carrier on which the print members are mounted. In this context, the word "chain" is used to denote the assemblage of printing members or slugs on an endless carrier loop whether the loop itself is a series of interconnected links or an integral flexible belt. Hence, in the description to follow, and as well, in the appended claims, the word "chain" in the context of the phrase "print chain" denotes the aforementioned assemblage of printing members and not a delineation of a series of interconnected discrete links from an integral flexible belt.

The present invention provides an extremely versatile chain printer in which such required characteristics as precision and reliability of operation achieved at low costs by a modular or sub-assembly construction in which the principal support for each of the basic component assemblies is a length of precision formed stock of the same cross-section. The cross-section of the principal support members is designed to provide tracks by which standard commercially available connector devices may be employed in the assembly of components, thereby reducing to a minimum the necessity for precision located holes. Reliability together with low cost in the print chain are afforded by integrally cast printing slugs clipped about the edges of a commercially available fiberglass-reinforced, rubber timing belt in a manner such that metal-to-metal contact is reduced to a minimum and machine timing is preserved. To reduce the number of parts required to effect record receiving web or paper feed, a single pair of feed tractors in employed and the drive of these tractors controlled by a paper feed clock pulse and format control loop appropriately coded for photoelectric sensing, and driven directly by the paper feed tractors. Hence, not only is the paper feed control mechanism simplified but also, the reduction of moving parts minimizes inertia and contributes to enhanced operation.

An object of this invention is the provision of an extremely reliable, high speed chain printer which is low in cost both from the standpoint of manufacture and maintenance.

Another object of this invention is to provide a low-cost chain printer of the type aforementioned which is extremely versatile in the sense that variations in printer size can be achieved during manufacture with minimal tooling changes and also in the sense that changes in print formats and changes in print character configurations can be easily accomplished by persons having only ordinary mechanical skills.

An additional object of this invention is the provision of a low-cost chain printer of the type referred to which facilitates modular, or complete sub-assembly construction techniques as well as standardization of parts required for assembly.

A further object of this invention is the provision of a unique print chain for high speed printers of the type aforementioned by which metal-to-metal contact between the respective print slugs thereon is completely avoided.

A still further object of this invention is the provision of a print chain drive and guide means for chain printers of the type referred to by which printing slugs are constrained to a precisely defined print line during the operable or printing portion of their path of travel and which avoids unnecessary frictional forces to minimize wear.

Still another object of this invention is the provision of an improved paper or print medium feed mechanism for high speed printers in which the total number of moving parts required for operation is kept at a minimum to provide a low inertia paper feed system.

Yet, another object of this invention is the provision of the paper feed system for high speed printers of the type aforementioned, incorporating a paper feed clock pulse and format control in the form of an essentially inertialess paper loop driven past an appropriate sensing means by the same component employed to feed the print medium or paper.

Other objects and further scope of applicability of the present invention will become apparent from the detailed description to follow taken in conjunction with the accompanying drawings in which:

Figure 1:
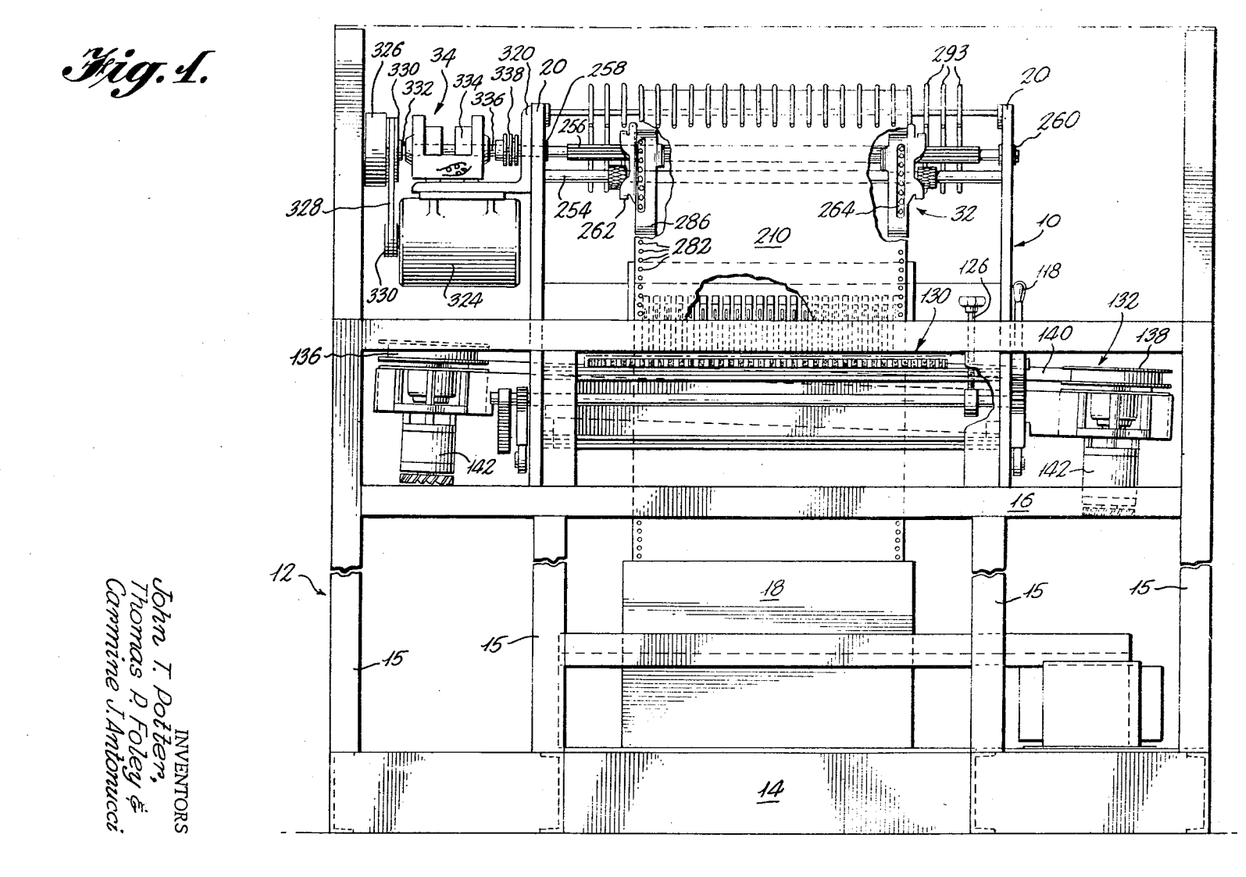
FIG. 1 is a fragmentary front elevation illustrating the chain printer of this invention.
Figure 2:
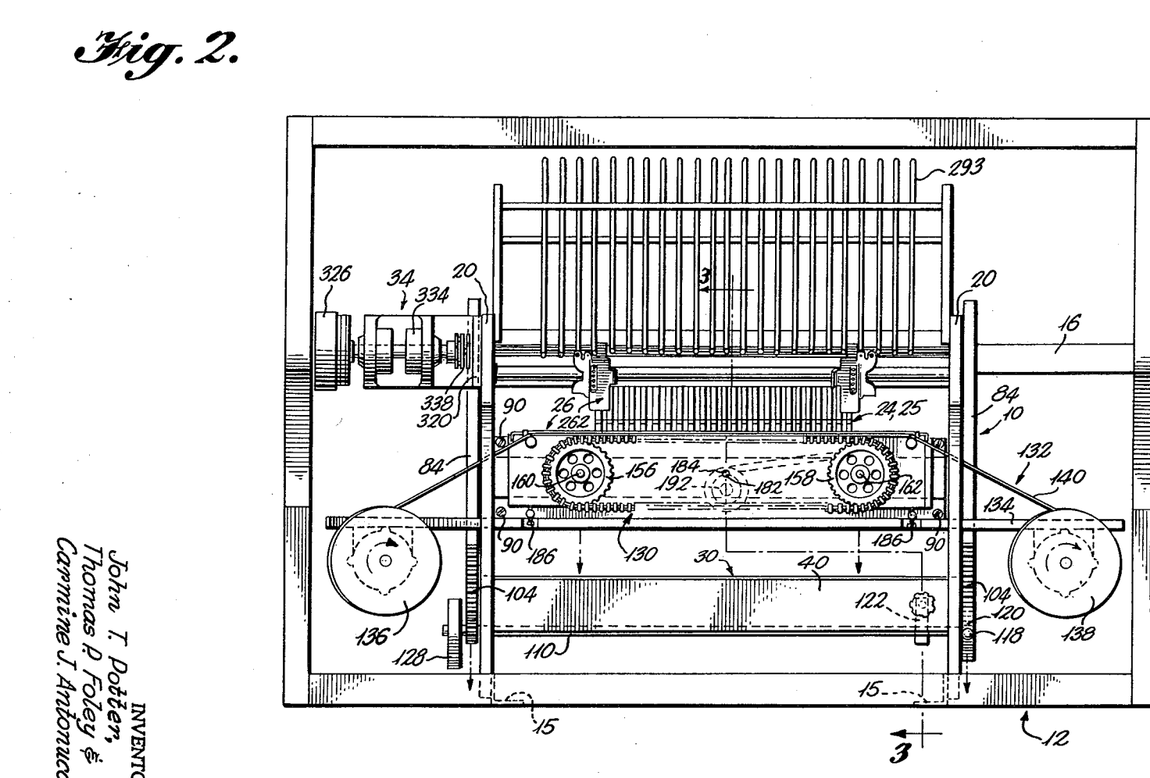
FIG. 2 is a top plan view of the printer illustrated in FIG. 1.
Figures 3, 19:
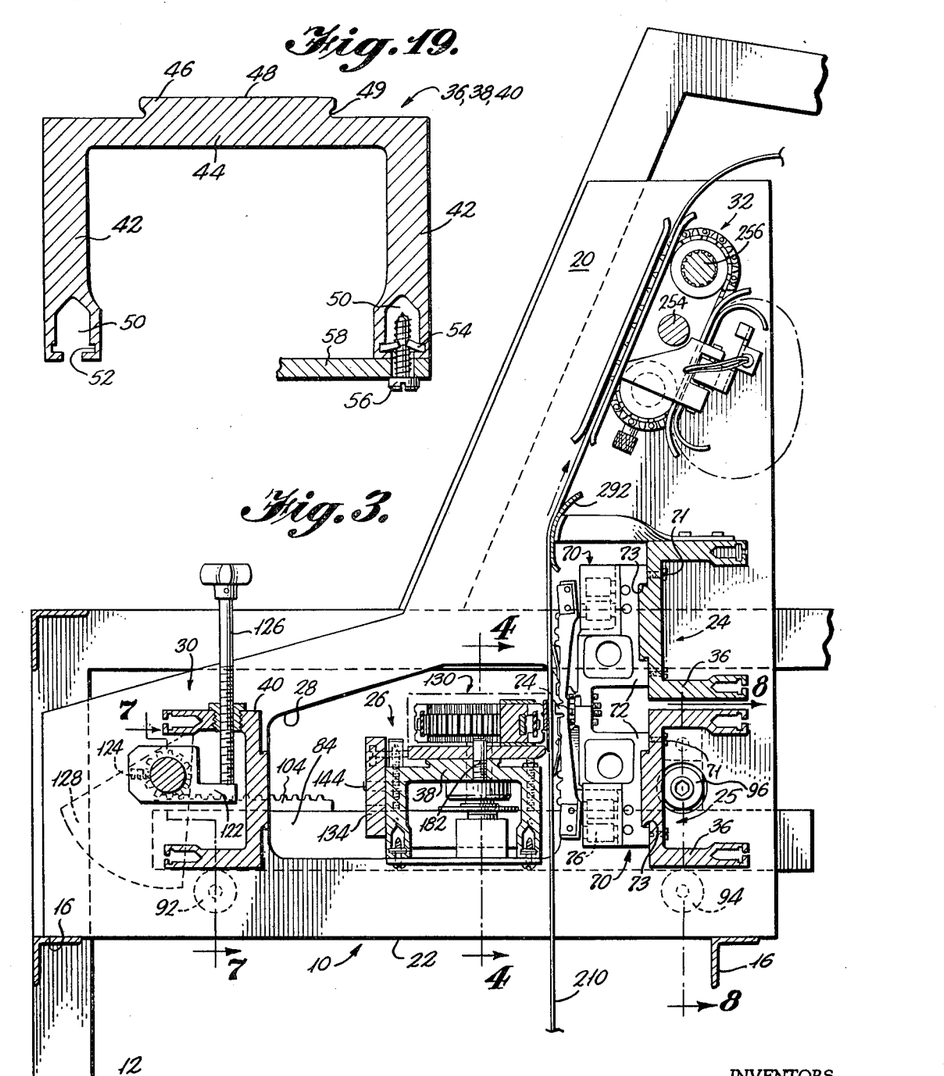
FIG. 3 is an enlarged fragmentary cross-section taken on line 3—3 of FIG. 2.
FIG. 19 is an enlarged cross-section of an assembly supporting member of this invention.

As shown in the drawings, and particularly in FIGS. 1-3 thereof, an embodiment of the high speed printer of this invention includes a chassis generally designated by the reference numeral 10 supported on a frame 12. The frame 12, in this instance, includes a base 14 on which a plurality of upright members or columns 15 are supported. A pair of laterally extending chassis support angles 16 extend the width of the frame and establish the frame support for the chassis 10. The remaining portions of the frame function principally to support various electronic components (not shown) conventionally employed with high speed printers of the type illustrated, a paper supply receptacle 18 and other auxiliary equipment. Also, the frame serves to support a cabinet or housing (not shown) for the printer. It will be appreciated therefore, that the frame structure illustrated in the drawings, though preferable, can be modified significantly to satisfy the needs of a particular installation or, if desired, to modify the exterior design features of the printer.

The chassis includes a pair of similarly shaped, spaced end plates 20 having a lower edge 22 to be supported by the angles 16 as shown in FIG. 3. All of the mechanical printing components of the printer of this invention are incorporated in modules or sub-assemblies supported on the end plates 20. As shown in FIGS. 1 to 3 of the drawings, these modules or sub-assemblies generally include a pair of hammer assemblies 24 and 25, a print chain and ribbon carriage assembly 26 extending through apertures 28 formed in each of the end plates 20, a carriage actuating assembly 30, a paper feed tractor assembly 32, and a paper feed drive motor assembly 34.

Although the details of the various assemblies aforementioned will be described in more detail below, it will be noted by reference to FIG. 3 of the drawings that the principal support structures for the hammer assemblies 24 and 25, the print chain and ribbon carriage assembly 26, and the carriage actuating assembly 30 are provided by accurately machined extruded channel members 36, 38 and 40, respectively. Each of the channel members 36, 38 and 40 have cross-sections identical to that illustrated in FIG. 19 of the drawings. As shown, the extruded section includes a pair of legs or flanges 42 connected by a web portion 44 having a ridge 46 projecting outwardly therefrom. The top outer surface 48 of the ridge 46 is accurately machined to define a true planar surface whereas the sides of the ridge as they merge with the web portion 44 are undercut as at 49 to provide an accurately defined width of the ridge 46. Also, the remaining exterior surfaces of the channel are machined to assure the establishment of mutually perpendicular planar surfaces. The foot or extending ends of the legs 42 are each provided with a bolt channel 50 having an undercut portion establishing a nut track 52. The nut tracks 52 are adapted to receive appropriately formed nuts such as Tinnerman nuts 54 so that a bolt 56 may be passed through a hole in a member 58 to secure it to the channel at any desired position along the length thereof. Because therefore, each of the channels 36, 38 and 40 are identical in cross-section, a significant cost advantage is obtained. For example, the extrusions may be stocked in long lengths and then cut and machined to the proper lengths for the particular function to be served by the severed length. Also, the simultaneous extrusion and machining of the channel members assures accuracy with respect to relative dimensions of the various channels 36, 38 and 40 as they are incorporated into the printer.

Figure 10:
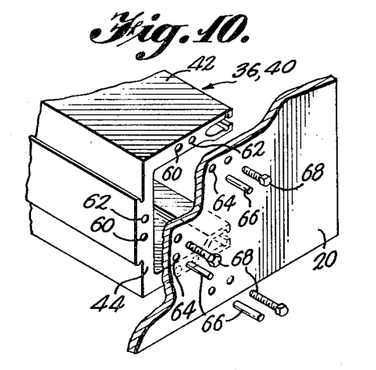
FIG. 10 is an exploded view showing the interconnection of major chassis components of the printer of this invention.

Each of the channels 36 and 40 are assembled between the end plates 20 and very accurately positioned with respect to one another by a combination dowel and bolt connection depicted by FIG. 10 of the drawings. Hence, the flanges 42 and the web 44 of each of the channels 36 and 40 are provided respectively with a dowel hole 60 and a tapped or threaded hole 62. Similarly, each of the end plates is provided with accurately located dowel holes 64 to align with the dowel holes 60 in the channels so that dowels 66 may be passed through the dowel holes in the end plates and into the dowel holes 60 in the channel to locate the channel members accurately. Thereafter, screws or bolts 68 are passed through the plates 20 and into the tapped holes 62 in the channel to secure the assembly of the channel to the end plates. It will be appreciated that by accurately machining the end faces of each of the channels 36 and 40 so as to define planar surfaces perpendicular to the longitudinal axes of the channels, the connection of the channels 36 and 40 in the manner aforementioned serves, in addition to locating the channel members relative to one another, to impart rigidity and strength to the chassis 10.

Referring now in more detail to the construction of the assemblies above mentioned, it will be noted that the hammer assemblies 24 and 25 each include a bank of hammer modules 70 assembled on the channels 36 by screws 71. The hammer modules are identical, each generally including a frame 72 having an accurately machined cut-out 73 to complement the ridges on the channels 36 and a hammer 74 adapted to be fired electromagnetically by solenoids 76 controlled by an electronic firing circuit (not shown). Although further detailed description of each hammer module 70 is not necessary for a complete understanding of the present invention, reference may be had to a copending application Ser. No. 479,828, filed Aug. 16, 1965, by John T. Potter for a complete disclosure of the hammer modules. As shown in FIG. 3, the hammer modules 70 in the hammer assembly 24 are inverted and staggered with respect to the hammer modules in the assembly 25 so that the hammers 74 of each bank of hammer modules is aligned on a print line. Also, it is contemplated that the hammer modules will be pre-assembled on the channels 36 so that each of the assemblies 24 and 25 may be incorporated on the chassis 10 without requirement for further mechanical adjustment. This procedure is facilitated by the interlocking engagement of the hammer modules 70 by the channel members 36 due to the reception of the ridge 46 on the channel members in the cut-outs 73 of the module frames 72.

Figure 4:
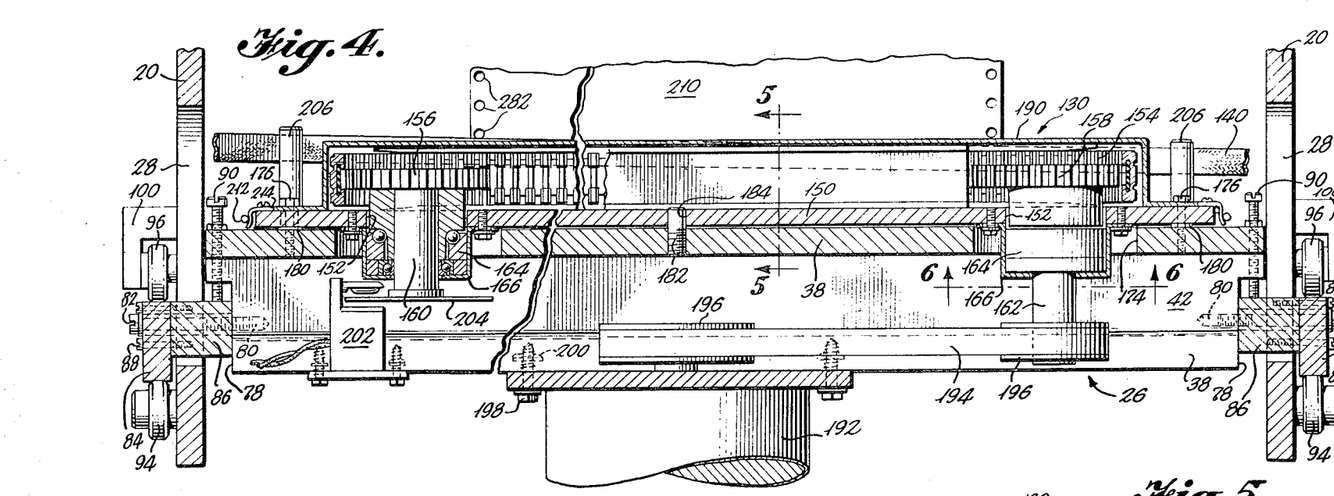
FIG. 4 is an enlarged fragmentary cross-section taken on line 4—4 of FIG. 3.

The manner in which the print chain and ribbon carriage assembly 26 is supported on the chassis 10 is most clearly shown in FIGS. 2, 4, 7 and 8 of the drawings. Referring particularly to FIG. 4, it will be noted that the ends of the flanges 42 on the carriage channel 38 are cut out to provide a shoulder 78 and provided with tapped or threaded bores 80. The tapped bores 80 each receive a bolt or screw 82 passed through a rail 84 and a spacer block 86. The rail 84 and spacer block 86 are secured to one another by any suitable means such as screws 88 and are provided with an oversized aligned bore through which the bolt or screw 82 passes. A pair of set screws 90 are treadably received in the web of the channel 38 on each end thereof overhanging the shoulder 78 so as to abut the spacer block 86. Also, it will be noted that the spacer blocks extend through the openings 28 in each of the end plates 20 so that the rails 84 are positioned on the outside of the end plates 20. Each of the rails 84 is identical and further, each is supported on front and rear fixed rollers, 92 and 94 respectively, journaled on the outside of the end plates 20. The channel 38, therefore, and thus the print chain and ribbon carriage assembly 26 is supported on the rollers 92 and 94 by the rails 84 and may be adjusted vertically with respect to the rollers 92 by the set screws 90 prior to drawing the bolts 82 tightly against the rails 84 and spacer blocks 86.

To retain the rails 84 against the rear rollers 94, a guide roller 96 is supported on the outside of each of the end plates 20 in a position to overlie the rail and the rear rollers 94. As shown most clearly in FIG. 8 of the drawings, each of the guide rollers 96 is journaled on an axle 98 carried by an L-shaped bracket 100 secured adjustably to the respective end plate 20 by a bolt 102. The distance between the axis of the bolt 102 and the upper surface of the rail 84 on each side of the chassis 10 is less than the distance between the circumferential surface of the roller 96 and the axis of the bolt 102. Because of this arrangement, the bracket may be rotated about the axis of the bolt 102 until the guide roller 96 properly engages the corresponding rail 84. Then the bolt is drawn tightly against the outer surface of the bracket to retain the roller 96 in the proper position.

Figure 7:
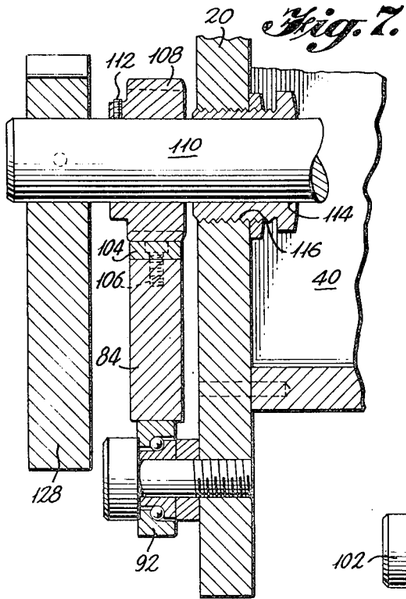
FIG. 7 is an enlarged fragmentary cross-section taken on line 7—7 of FIG. 3.
Figure 8:
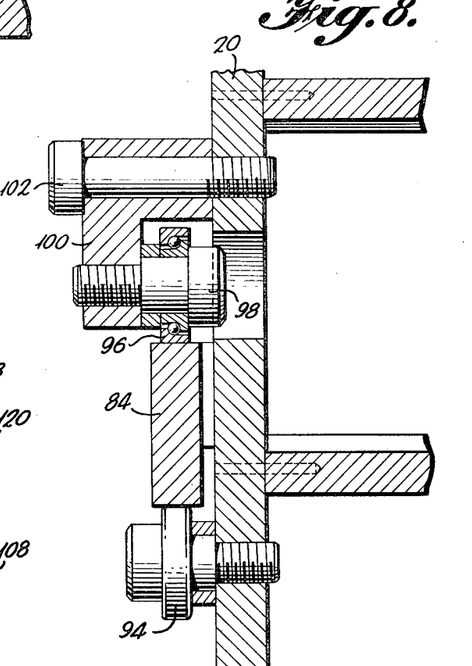
FIG. 8 is an enlarged fragmentary cross-section taken on line 8—8 of FIG. 3.
Figure 9:
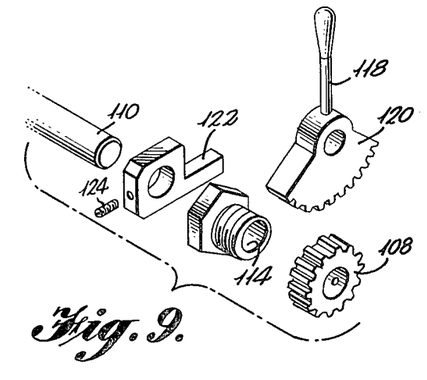
FIG. 9 is an exploded view showing components of the carriage feed mechanism of the printer of this invention.

As shown in FIGS. 2 and 7 of the drawings, the front end of each of the rails 84 carries a rack section 104 on its upper surface, secured by suitable means such as counter-sunk screws 106. The rack section of each rail is engaged by a pinion 108 fixed non-rotatably near each end of a shaft 110 by suitable means such as set screws 112. The shaft 110 is journaled in eccentric threaded bushings 114 received within properly located tapped holes 116 in each of the end plates 20. The eccentricity of the bushings 114 serves to provide a vertical adjustment of the shaft 110 and thus of the pinions 108 relative to the rails 84 and the front rollers 92 on which each rail is supported. It will be appreciated that rotation of the pinions 108 will serve to move the rack sections 104 and thus the rails 84 and carriage assembly 26 rectilinearly toward and away from the hammer assemblies 24 and 25. Because of the eccentric bushings 114, however, the pinions function additionally as guide members to hold the rails 84 down against the front rollers 92.

To rotate the shaft 110 and thus position the print chain and ribbon carriage assembly 26 relative to the hammer heads 74, a rapid traverse lever 118 fixed to a gear segment 120 is pivotally mounted on the exterior of one of the end plates so that the segment engages the pinion 108 on that end of the shaft 110. The ratio between the gear segment and pinion 108 is such that a limited angular movement of the lever 118 effects movement of the carriage over substantially its complete length of travel. To provide for a fine or vernier adjustment of the carriage, a lever stop 122 is non-rotatably fixed to the shaft 110 such as by a set screw 124. An adjustable stop screw 126 (see FIG. 3) is threadably received in the upper flange of the channel member 40 in a position to engage the stop lever 122. A counter weight 128 is secured to the shaft 110 at the opposite end thereof from the end adjacent to gear segment 120 and is positioned so that the lever 122 will be biased against the end of the stop screw 126 when the carriage assembly 26 has reached the end of its travel in a direction toward the hammers 74. Thereafter, fine adjustments may be effected by manipulation of the set screw 126 for reasons which will become more apparent from the description to follow.

As shown in FIGS. 1-5 of the drawings, the carriage assembly 26 supports a print chain sub-assembly and an ink ribbon sub-assembly designated generally by the reference numerals 130 and 132, respectively. The ink ribbon sub-assembly includes an elongated mounting bar 134 supporting spools 136 and 138 at opposite ends thereof which extend through the openings 28 in the end plate 20. An ink ribbon 140 is connected at its ends to the spools 136 and 138 and each spool is provided with a reversible drive motor 142 so that the ribbon may be passed from one of the spools to the other and reversed as desired. The ink ribbon sub-assembly is mounted to the carriage channel 38 by a centrally located dowel 144 extending through a complementary hole formed in the ribbon support bar 134. The ribbon bar 134 is further fixed to the channel 38 by conventional screws (not shown). It will be noted by reference to FIG. 1 of the drawings that the bar 134 and thus the ribbon sub-assembly is mounted on a slight incline with respect to the carriage assembly 26 and thus with respect to the print chain sub-assembly 130. Because of this inclination of the ribbon, each print line will be impressed angularly across the entire width of the ribbon 140. Accordingly, the entire width, as distinguished from a narrow band of this ribbon will be used during printing.

Figure 5:
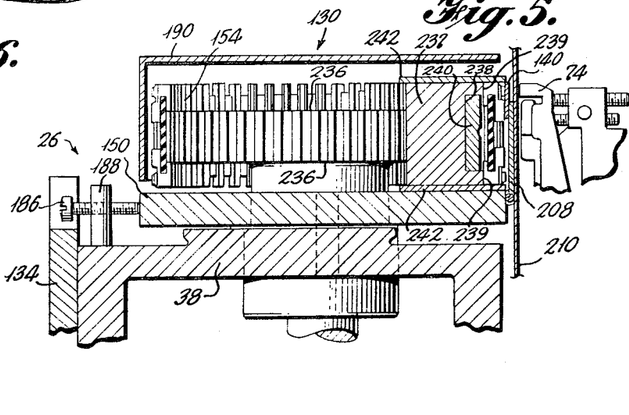
FIG. 5 is an enlarged fragmentary cross-section taken on line 5—5 of FIG. 4.
Figure 6:
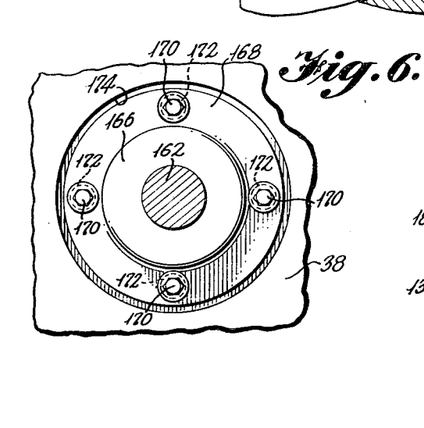
FIG. 6 is an enlarged fragmentary cross-section taken on line 6—6 of FIG. 4.

The organization of the print chain sub-assembly 130 and the manner in which it is incorporated in the carriage assembly 26 may be understood by reference to FIGS. 2-6 and 11 of the drawings. As shown in FIGS. 4 and 3, the print chain sub-assembly 130 includes a base plate 150 of generally rectangular configuration and having a pair of spaced apertures 152 of generally rectangular configuration and having a pair of spaced apertures 152 formed therein. An endless print chain 154 is trained about a pair of gears or sprockets 156 and 158 fixed on shafts 160 and 162, respectively. Each of the shafts 160 and 162 is supported by ball-bearing assemblies 164 in turn carried in bearing cups 166 each having an annular flange 168 secured to the underside of the plate 150 by screws 170. As shown in FIG. 6, the flange 168 on each of the bearing cups 166 is provided with oversized holes 172 so that the gears 156 and 158 carried by the cups 166 may be adjusted slightly relative to one another primarily to facilitate achievement of proper print chain tension. To accommodate the bearing cups 166, the upper portion or web of the carriage channel 38 is provided with enlarged openings 174.

The print chain sub-assembly 130 is mounted on the carriage channel 38 by threaded bolts 176 passing through oversized holes in the plate 150 and threadably received in the web of the carriage channel 38. The plate is spaced slightly from the upper surface of the channel 38 by washers or shims 180 as shown in FIG. 4. It will be appreciated that these shims 180 can be varied in number or thickness to determine the precise vertical location of the plate and thus the print chain sub-assembly with respect to the carriage channel 38. To locate the print chain sub-assembly accurately with respect to the channel 38 in a horizontal plane, a central dowel pin 182 in the web of the channel 138 is arranged to register with an accurately located hole 184 in the plate 150. The angular positioning of the plate 150 about the axis of the dowel pin 182 is established by a pair of set screws 186 mounted on posts 188 received in the carriage channel 38. Thus, by adjusting the set screws 186, the print chain sub-assembly may be positioned very accurately on the carriage assembly 26 while the bolts 176 are loose. After the proper position has been obtained, the bolts 176 are tightened down to secure the assembly. The bolts 176 also secure a chain guard or cover 190 over the print chain 154 as shown in FIGS. 4 and 5 of the drawings.

The print chain 154 is driven at a precisely established uniform rate of speed by a drive motor 192 operably coupled to the shaft 162 by a drive belt 194 and pulleys 196. The motor 192 is supported on the carriage channel 38 by bolts 198 threadably engaging Tinnerman nuts 200 received in the nut tracks 52 of the channel 38 in the manner described above with reference to FIG. 19. Hence, proper tension of the belt 194 can be achieved merely by loosening the bolts 198 and sliding the entire motor assembly in the nut tracks. Also supported from the Tinnerman nut tracks in the carriage channel 38 is a photoelectric cell and lamp assembly 202 to generate print slug timing pulses in accordance with the arrangement of slots on a timing disc 204 fixed to the lower end of the shaft 164 as shown in FIG. 4 of the drawings.

Figures 11, 12, 13, 14, 15:
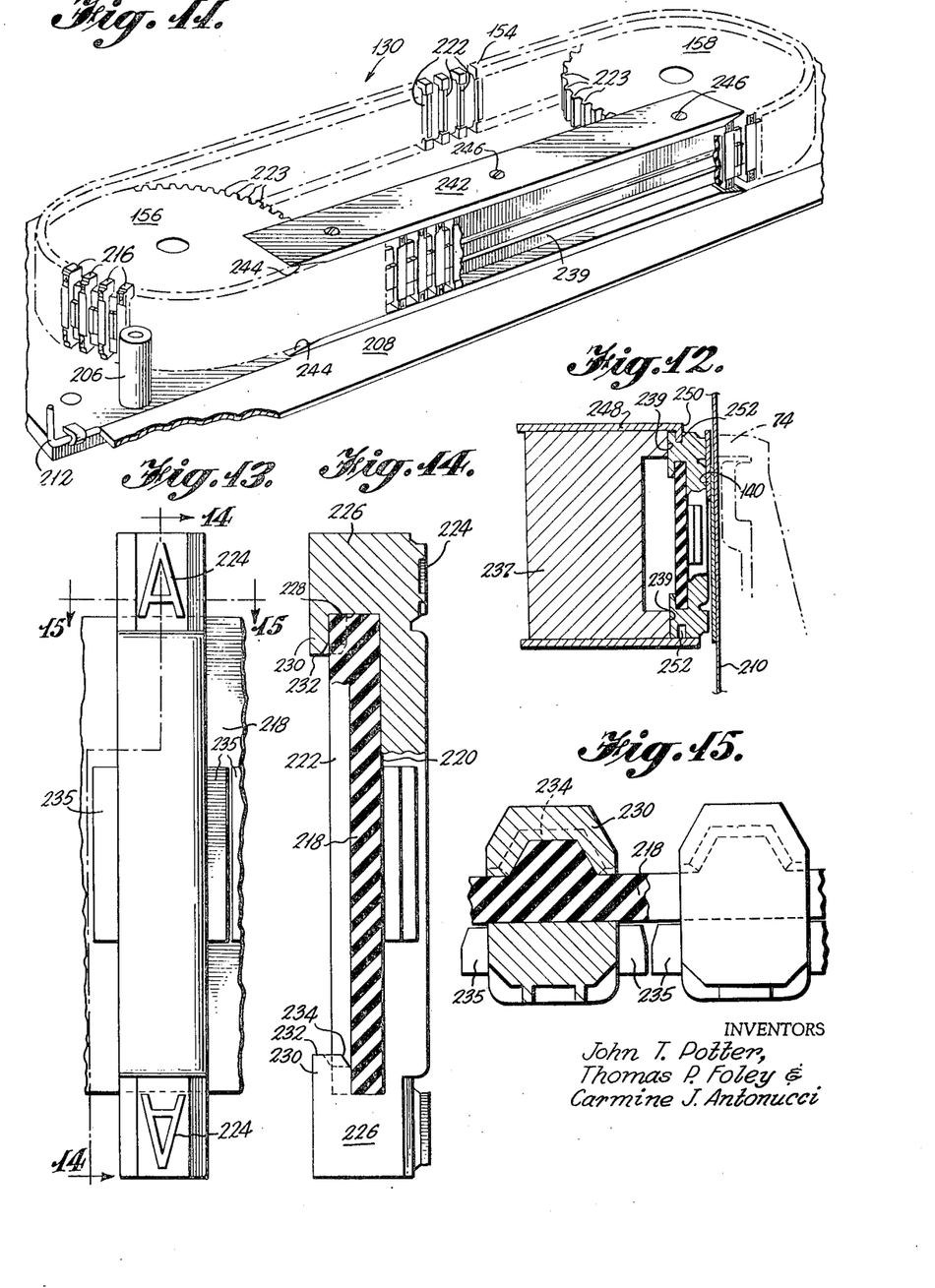
FIG. 11 is a fragmentary perspective view, partially cut away, and illustrating a print chain assembly in accordance with this invention.
FIG. 12 is a fragmentary cross-section illustrating an alternative form of print chain guide mechanism in accordance with this invention.
FIG. 13 is an enlarged front elevation of a printing slug of this invention.
FIG. 14 is a cross-section taken on line 14—14 of FIG. 13.
FIG. 15 is a fragmentary cross-section taken on line 15—15 of FIG. 13.

Other components supported on the print chain subassembly 130 include a pair of ribbon guide posts or rollers 206 supported on the plate 150. As shown in FIGS. 2 and 4 of the drawings, the guide posts 206 are positioned to constrain the ribbon 140 in a path spaced slightly from the face of the print chain 154 during the portion of its flight past the hammers 74. Further, a ribbon guide 208 in the form of a flat rectangular strip is pivotally mounted on the edge of the plate 150 to be movable from an inoperative or open position as shown in FIG. 11 to an operative position as shown in FIG. 5 wherein the ribbon is held out of contact with a record receiving web or paper 210 fed upwardly between the hammers 74 and the print chain 154 by the paper feed tractor assembly 32. To facilitate pivoting the ribbon guide between the aforementioned postions, an L-shaped handle 212 is provided on each end of the ribbon guide 208 and engageable by a spring detent 214 on the plate 150 to secure the ribon guide in the operative ribbon guiding position. The ribbon guide 208, as shown in FIG. 5 of the drawings for example, extends partially over the width of the print chain 154 by an amount sufficient to prevent the ribbon 140 from contacting the web of paper 210 while permitting the hammers 74 to move or impact the paper against the ribbon and print chain.

An important feature of the printer of this invention from the standpoint of cost reduction as well as maintenance-free operation resides in the structure of the print chain 154 and the means by which it is guided through its path of travel during operation. As shown in FIGS. 11 and 13–15, the print chain includes a plurality of printing slugs 216 mounted on a dimensionally stable elastomeric belt 218. The belt 218 is formed from fiberglass reinforced neoprene and is of a type known as a timing belt currently manufactured by the United States Rubber Company. The configuration of the belt, as illustrated, provides a smooth outer face 220 whereas the inner face is provided with a series of unformly spaced teeth 222 extending across the full width of the belt and arranged to be positively engaged by teeth 223 on the sprockets or gears 156 and 158. Such belts have been found highly effective from the standpoint of providing smooth, silent operation without stretching or otherwise elongating even though used for long periods of time under load conditions far exceeding the loads incurred by a print chain.

The printing slugs 216 are particularly designed to be mounted on the belt 218 very simply without additional fastening means and so that all metal-to-metal contact within the print chain itself is avoided. Each of the print slugs 216 is, therefore, provided with a front face in which alphanumeric type or print characters 224 are provided near the upper and lower ends thereof. Although it is contemplated that only the upper characters will be used during printing, the provision of a character on both ends of the slug may be employed either to double the life of the print slugs or to lend versatility by providing different characters on the top and the bottom of the slugs. An example of such different characters would be the provision of lower case letters on one end and upper case letters on the other. Formed at the upper end lower ends of each of the print slugs 216 are rearwardly extending undercut portions 226 defining mutually facing ledges 228 spaced by a distance substantially the same as the width of the belt 218. The rearwardly extending portions 226 each have an inwardly projecting wall 230 to provide pockets of a configuration conforming with or complementing the teeth 222 on the belt 218 as shown most clearly in FIG. 15 of the drawings. Also it will be noted that each of the wall portions 230 terminates in a flat bearing surface 232 chamfered to provide and inclined portion 234 to facilitate mounting the slugs 216 on the belt 218. Although the complementing configuration of the print slugs 216 and the belt teeth 222 assures proper location of the respective printing slugs 216 on the belt 218, locating shoulders 235 may be employed. The shoulders 235 function to avoid misregistration or misplacement of the print slugs on the belt during assembly and to stabilize the slugs on the belt, but they do not contact after the printing slugs 216 have been mounted on the belt 218. To assemble the print slugs 216 on the belt 218, it is only necessary to compress the belt slightly across its width, move the printing slug into place, and then release the belt so that the edges thereof move into the space between the rear wall portions 230 and the front or body portion of the printing slugs.

The means for guiding the print chain 154 through its path of travel is most clearly illustrated in FIGS. 4, 5, 11 and 12 of the drawings. To retain the print chain 154 against axial displacement relative to the gears 156 and 158, the gears are formed with flat radial surfaces 236 spaced apart by a distance slightly less than the distance between the surfaces 232 on the back side of each of the print slugs 216. Thus, the surfaces 232 engage the radial surfaces 236 of the sprockets 156 and 158 to hold the print chain 154 against axial displacement without interfering with a rubber-to-metal contact between the belt and the gears 156 and 158. The print chain 154 is further guided during the operative or printing portion of its path when the printing slugs 216 are in registry with the print hammers 74 by a back-up bar 237 having a channel 238 in its front face to define upper and lower guide faces or tracks 239. In the embodiment of FIGS. 5 and 11, the channel 238 receives an elongated bar magnet 240 to constrain the print slugs 216 in light sliding contact with the tracks 239. In this manner, the print slugs are held against displacement in the direction of hammer impact. To assure vertical registration during the printing portion of the path of travel taken by the print chain 154, a pair of upper and lower guide plates 242 having tapered diverging end portions 244 project outwardly beyond the track surfaces 239 to constrain the print slugs in a well defined transverse print line. The guide plates as well as the back-up bar 237 may be secured to each other and to the plate 150 by suitable means such as screws 246.

In an alternative embodiment shown in FIG. 12 of the drawings, mechanical rather than magnetic means are used to retain the print slugs 216 against the back-up bar 237. In this embodiment, the magnet is omitted from the channel 238 and in place of the upper guide bar 242, a guide plate 248 having an accurately machined, downwardly propecting guide portion 250 is employed. The print slugs, in this instance, are provided with notches 252 in their upper and lower ends to accommodate the guide portion 250 and be retained against the tracks 239 and thus against deflection in the direction of hammer impact. It should be noted that it is only necessary to hold the upper portion of the print slugs against the upper track 239 on the back-up bar 237 since only the character 224 on the upper end of the slug is employed during printing.

It is contemplated that each of the surfaces contacted by the printing slugs 216 during their travel will be treated with a dry or solid lubricant to minimize friction between the print slugs and the surfaces. For example, the tracks 239 and inner faces of the guide plates 242 in the embodiment of FIGS. 4, 5 and 11 as well as the guide portion 250 in the embodiment of FIG. 12 will be coated with an appropriate solid lubricant such as Teflon, graphite, molybdenum disulphide or the like. Also, these surfaces might be formed by hard metal alloys capable of being impregnated with a dry lubricant so that the surfaces remain lubricated indefinitely.

Figures 16, 17, 18:
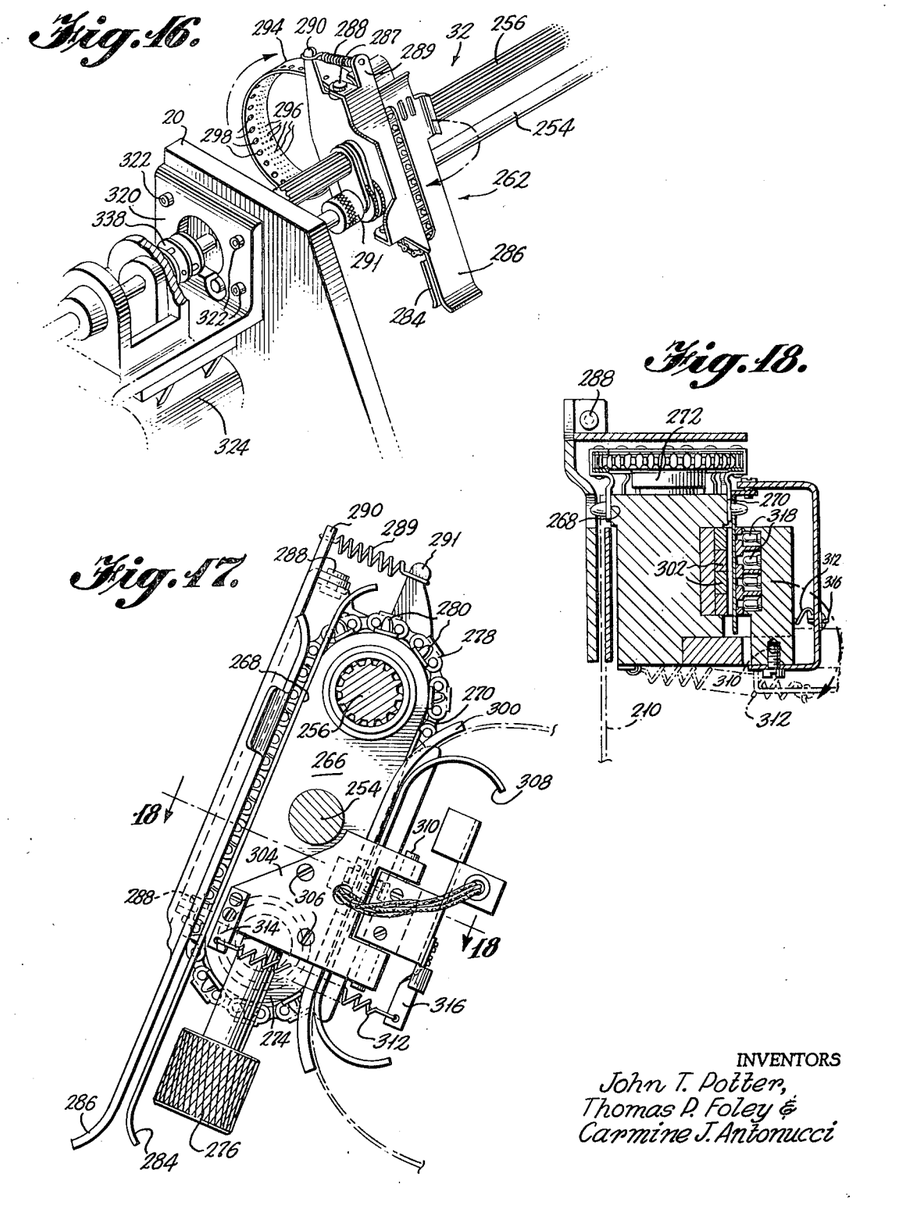
FIG. 16 is a fragmentary perspective view illustrating a paper feed tractor in accordance with the present invention.
FIG. 17 is a side elevation of the tractor illustrated in FIG. 16.
FIG. 18 is a cross-section taken along line 18—18 of FIG. 17.

A more complete understanding of the paper feed tractor assembly 32 may be had by reference to FIGS. 1 and 16–18 of the drawings. As shown in FIG. 1, the assembly 32 includes a guide rod 254 fixed on opposite ends in the end plates 20. Spaced slightly upwardly from the guide rod 254 is a rotatable splined drive shaft 256 journaled in bushings 258 and 260 supported in the end plates 20. A pair of drive tractors 262 and 264 are received on the guide rod 254 and splined drive shaft 256. The paper drive structure of each of the tractors 262 and 264 is the same and in each instance, a body member 266 having front and rear track surfaces 268 and 270, supports a rotatable drive sprocket 272 and an idler sprocket 474 (FIGS. 17 and 18). The idler sprocket 274 is journaled adjustably in the body member 266 and a tension knob 276 is provided for adjusting the idler sprocket to tension a drive chain 278 trained about the sprockets 272 and 274. The drive sprocket 272 is internally splined to complement the splined drive shaft 256 so that the drive sprocket 272, and thus the chain 278, may be driven in accordance with rotational movement of the splined shaft 256. Also, the chain 278 includes a series of uniformly spaced pins 280 for engaging similarly spaced apertures 282 along the marginal edges of the paper web 210. The front portion of each of the drive tractors further includes a fixed paper guide 284 and a movable guide or paper hold-down plate 286 pivotally mounted to the body member 266 by a pintel hinge 287. An over-center toggle spring 288 extending between a tongue 289 on the paper hold-down plate 286 and a fixed post 290 on the body member 266 serves to hold the plate in either a closed or opened position.

Each of the drive tractors 262 and 264 include lateral positioning clamps 291 engageable with the guide rod 252 to fix the lateral position of each drive tractor relative to the printer chassis 10. The precise positioning of the drive tractors relative to each other is predicated on the width of the paper web 210. Further, and under certain circumstances it may be desirable to reposition both of the drive tractors relative to the chassis for centering and other purposes. Thus, it will be appreciated that both marginal edges of the web 210 pass between the guides 284 and 286 and are fed in accordance with movement of the tractor pins 280.

Additional means is provided for guiding the paper web 210 to aid in locating the paper properly between the hammers 74 and the ribbon 140 and as well, to guide the printed web 210 as it is discharged from the tractors 262 and 264. As shown most clearly in FIGS. 1–3 of the drawings, a guide plate 292 is fixed to the channel 36 of the upper hammer assembly 24 and positioned relative to the hammers 74 to assure proper passage between the hammers and the print chain 130. A curved wire rack guide 293 is mounted between the end plates 20 and positioned to guide the printed paper delivered by the tractors 262 and 264 rearwardly of the chassis 10. The guide rack 293 serves principally to guide the paper in such a manner to clear various electronic components disposed to the rear of the machine (not shown).

Although, as indicated above, the paper feeding structure of both drive tractors 262 and 264 is the same, it is to be noted that one of the drive tractors, specifically the drive tractor 262 in the embodiment shown, is equipped with means for carrying a paper feed clock pulse and format control loop 294. The control loop is provided with a series of apertures 296 positioned in a coded pattern in accordance with conventional practice to enable the development of various control functions in the paper feed assembly, such as for example, the spacing of lines, the starting point on a page or sheet to be printed and the like. While paper feed clock pulse and format control loops are, in and of themselves well known in the printer art, an important feature of the present invention resides in the manner in which the loop 294 is driven in synchronism with the paper web 210. To this end, the back of the feed tractor 262 is equipped with means by which the tractor pins 280 thereof which drive the paper web 210, also drive the clock pulse and format control loop 294 by engaging tractor holes 298 arranged in one edge thereof. This structure includes a fixed guide plate 300 having a gap in its central portion to facilitate mounting a bank of photoelectric cells 302. A bracket 304 fixed to the body 266 such as by screws 306 carries a hinged guide 308 on a pintel hinge 310. An over-center spring 312 is connected between posts 314 and 316 mounted on the bracket 304 and the hinged guide 308 respectively, to hold the hinge guide 308 in either a closed position or in an opened position in a manner similar to that described above with respect to the paper hold-down 286 on the front of the tractors.

The hinged guide 308 also carries a bank of electric lamps 318 which register with the photocells 302 and with the apertures 296 in the clock pulse and format control loop 294. Thus, as the paper web 210 is fed by the tractors, the loop 294 is simultaneously fed. Control pulses developed by the respective photocells 302 are fed to the electronic system (not shown) of the printer. It will be appreciated therefore, that not only is the clock pulse and format control loop 294 fed accurately and in synchronism with the paper by the same means, namely the tractor pins 280, but also, the loop 294 is fed without adding inertia to the paper feed assembly. In other words, the only movable element required to develop the needed paper feed clock pulse and format control signals is the loop 294 which is virtually inertialess.

The paper feed drive motor assembly, as shown in FIGS. 1, 2 and 16 includes an L-shaped mounting bracket 320 adapted to be secured by suitable means such as screw bolts 322 to the end plate 20 opposite the splined shaft 256. The bracket supports a drive motor 324 fixed to the bracket 320 and operably connected to a fly-wheel 326 by a belt 328 and pulleys 330. The fly-wheel is splined or keyed to an input shaft 332 of an electrically controlled clutch-brake unit 334 which operates to convert a continuous rotary input to very accurately controlled, intermittent rotary movement of an output shaft 336. The output shaft 336 is coupled to an end of the splined shaft 256 extending through the end plate 20 on which the bracket 320 is mounted by a flexible coupling 338. The coupling 338 is in the nature of a universal joint which is inflexible in the transmission of torque but which permits slight misalignments to occur between the shaft 336 and the splined shaft 256. In this manner, the entire paper feed drive motor assembly 34 may be pre-assembled and then mounted as a unit on the chassis 10 without requiring a high degree of care in aligning the shafts 336 and 256.

To prepare the printer of this invention for operation, the carriage assembly 26 is retracted away from the hammers 74 by proper manipulation of the lever 118. The web of paper 210 is then withdrawn from the receptacle 18 passed over the guide 292 and placed on the feed tractors 262 and 264 so that the pins 280 pass through the marginal apertures 282 in the paper web. The paper hold-down bars 286 on the feed tractors 262 and 264 are moved to a closed position so that the paper is confined on the feed tractors in the manner described above. Also the ribbon 140 is trained about the posts 206 and behind the ribbon guide 208 if this had not been done previously. The lever 118 is again actuated to move the carriage until the lever stop 122 engages the set screw 126 to position the carriage 26 and thus the print chain 130 in a precise position slightly spaced from the hammers 74. The precise position can be varied to darken or lighten the characters printed on the paper web 210 by slight adjustments of the set screw 126. Generally, however, the set screw 126 will not be moved during normal operation of the printer.

With the carriage 26 in the position shown in FIG. 3 of the drawings, for example, the machine power is turned on to energize the various components including the print chain drive motor 192, the paper feed drive motor 324, and the ribbon feed motors. During the printing operation, the paper web 210 is fed upwardly by the feed tractors intermittently into line registration with the upper row of print characters 224 on the print slugs 216. As each print line is thus registered, the hammers 74 are fired to impress the paper against the ribbon 140, and printing slugs 216 under the control of the electronic circuits (not shown). Because of the back-up bar 237 and associated guide means, the printing slugs 216 move in a precise line and are not deflected due to impact of the hammers 74 thereby assuring uniformity of printing or type on the web 210.

It will be appreciated therefore that by the present invention an improved chain printer is provided by which the above-cited objectives are completely fulfilled. Also, it will be appreciated by those skilled in the art that many variations and changes can be made in this invention without departing from the true scope and spirit thereof. Accordingly, it is to be distinctly understood that the foregoing description is illustrative of preferred embodiments only, not limiting, and that the true scope of the present invention is to be determined by reference to the appended claims.

The invention claimed is:

1. A high speed printer comprising: a chassis including a plurality of component supporting structural members, each of said members being severed from a common machined extrusion of channel-shaped cross-sectional configuration, thereby providing the same precise transverse dimensions in all of said members; means to interconnect said structural members so that they are positioned parallel to one another; a hammer assembly mounted on at least one of said structural members; a print chain carriage assembly mounted on another of said structural members, said print chain carriage assembly including a print chain, and means for driving said print chain at a constant speed in a uniform path; means for movably positioning said other of said structural members and thus said print chain carriage assembly relative to said hammer assembly; and means on said chassis to feed a record receiving web between said print chain and said hammer assembly.

2. The apparatus recited in claim 1 in which said means to interconnect said structural members includes a pair of spaced end plates, selected ones of said structural members extending between and being fixedly secured to said end plates to retain said end plates perpendicular to said structural elements.

3. The apparatus recited in claim 2 in which said means for movably positioning the other of said structural members includes spaced supporting elements on said end plates, a pair of rails movable rectilinearly on said supporting elements, and means to support the ends of said other structural member on said rails.

4. The apparatus recited in claim 5 in which said means to support the other of said structural members on said rails is adjustable to position said carriage assembly and thus said print chain relative to said hammer assembly.

5. The apparatus recited in claim 3 wherein said rails have rack sections thereon, and including further, a shaft journaled in said end plates, a pair of pinion gears fixed on said shaft and in engagement with said rack sections, and pinion rotating means for moving said rack sections simultaneously and thus said carriage assembly relative to said hammer assembly.

6. The apparatus recited in claim 5 including means for rotating said pinions to effect rapid traverse of said print chain carriage assembly toward and away from said hammer assembly and stop means for limiting movement of said print chain carriage assembly toward said hammer assembly, said stop means being adjustable to provide for accurate final positioning of said print chain relative to said hammer assembly.

7. The apparatus recited in claim 1 in which said print chain carriage assembly includes an ink ribbon subassembly having a mounting bar carrying ribbon spools on opposite ends thereof together with drive means for passing an ink ribbon between said spools, said bar being connected to said other of said structural members and means on said other structural member for guiding said ribbon through a path adjacent said print chain.

References Cited

UNITED STATES PATENTS

| | | | |
|---|---|---|---|
| 1,360,379 | 11/1920 | Dyer | 101—296 X |
| 2,925,773 | 2/1960 | Kingsley | 101—407 X |
| 2,940,385 | 6/1960 | House | 101—93 |
| 3,144,821 | 8/1964 | Drejza | 101—93 |
| 3,176,819 | 4/1965 | Bloom et al. | 197—133 |
| 3,285,164 | 11/1966 | Malavazos | 101—93 X |
| 3,288,058 | 11/1966 | Holt | 101—296 X |
| 2,023,047 | 12/1935 | Ganoe | 29—190 X |
| 2,963,781 | 12/1960 | Smith | 29—183 |

WILLIAM B. PENN, Primary Examiner

U.S. Cl. X.R.

29—183; 101—102; 197—133, 186

UNITED STATES PATENT OFFICE
CERTIFICATE OF CORRECTION

Patent No. 3,499,382                    Dated  March 10, 1970

Inventor(s)   John T. Potter et al.

It is certified that error appears in the above-identified patent and that said Letters Patent are hereby corrected as shown below:

Column 1, line 40, "is", first occurrence, should read -- in --. Column 2, line 7, "in" should read -- is --. Column 5, line 72, after "to" insert -- the --. Column 6, line 34, "3" should read -- 5 --. Column 7, line 53, "unformly" should read -- uniformly --. Column 8, line 11, "and" should read -- an --; line 61, "propecting" should read -- projecting --. Column 9, line 21, "474" should read -- 274 --. Column 12, line 11, "5" should read -- 3 --.

Signed and sealed this 4th day of May 1971.

(SEAL)
Attest:

EDWARD M. FLETCHER, JR.                WILLIAM E. SCHUYLER, JR.
Attesting Officer                      Commissioner of Patents